United States Patent Office 2,831,327
Patented Apr. 22, 1958

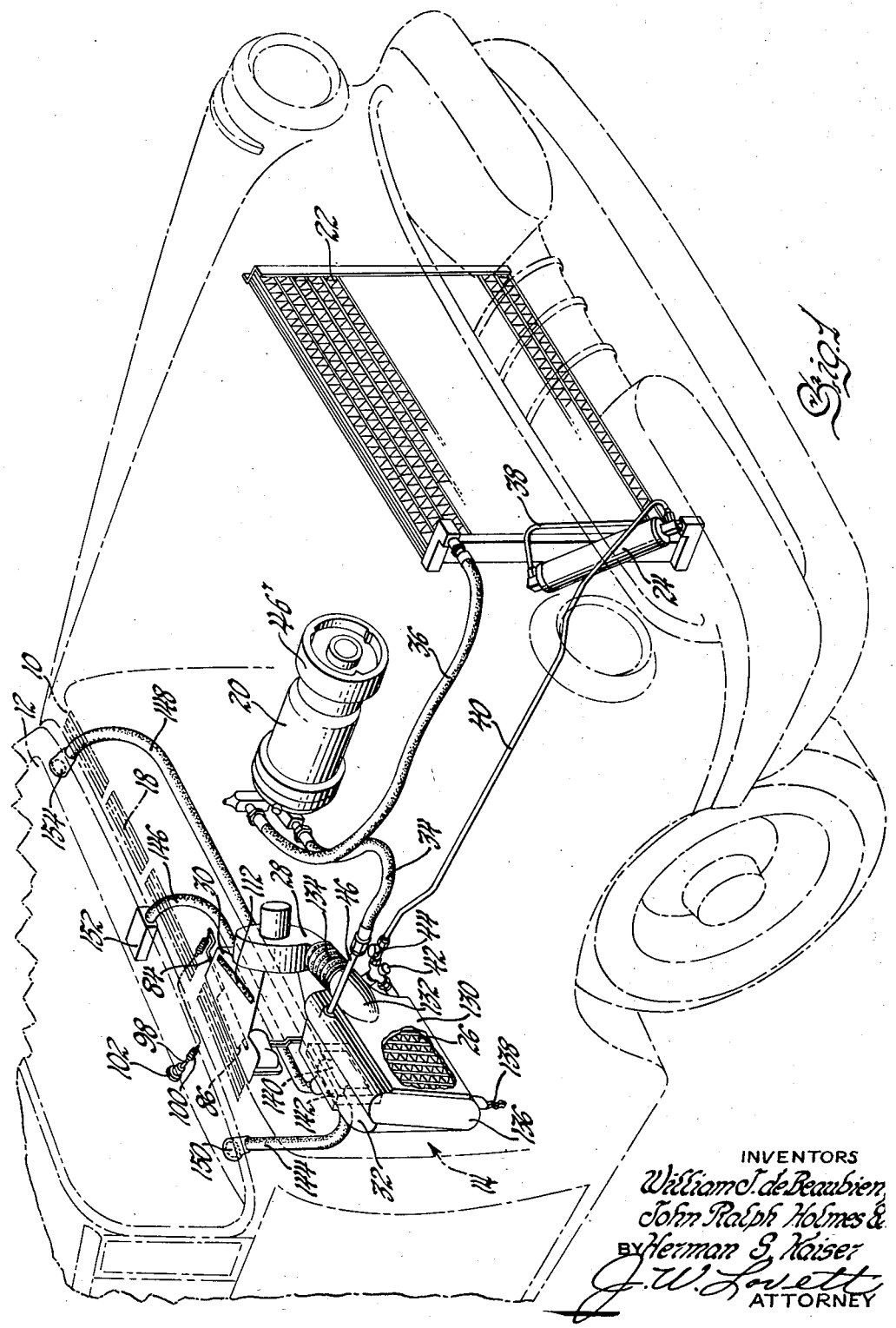

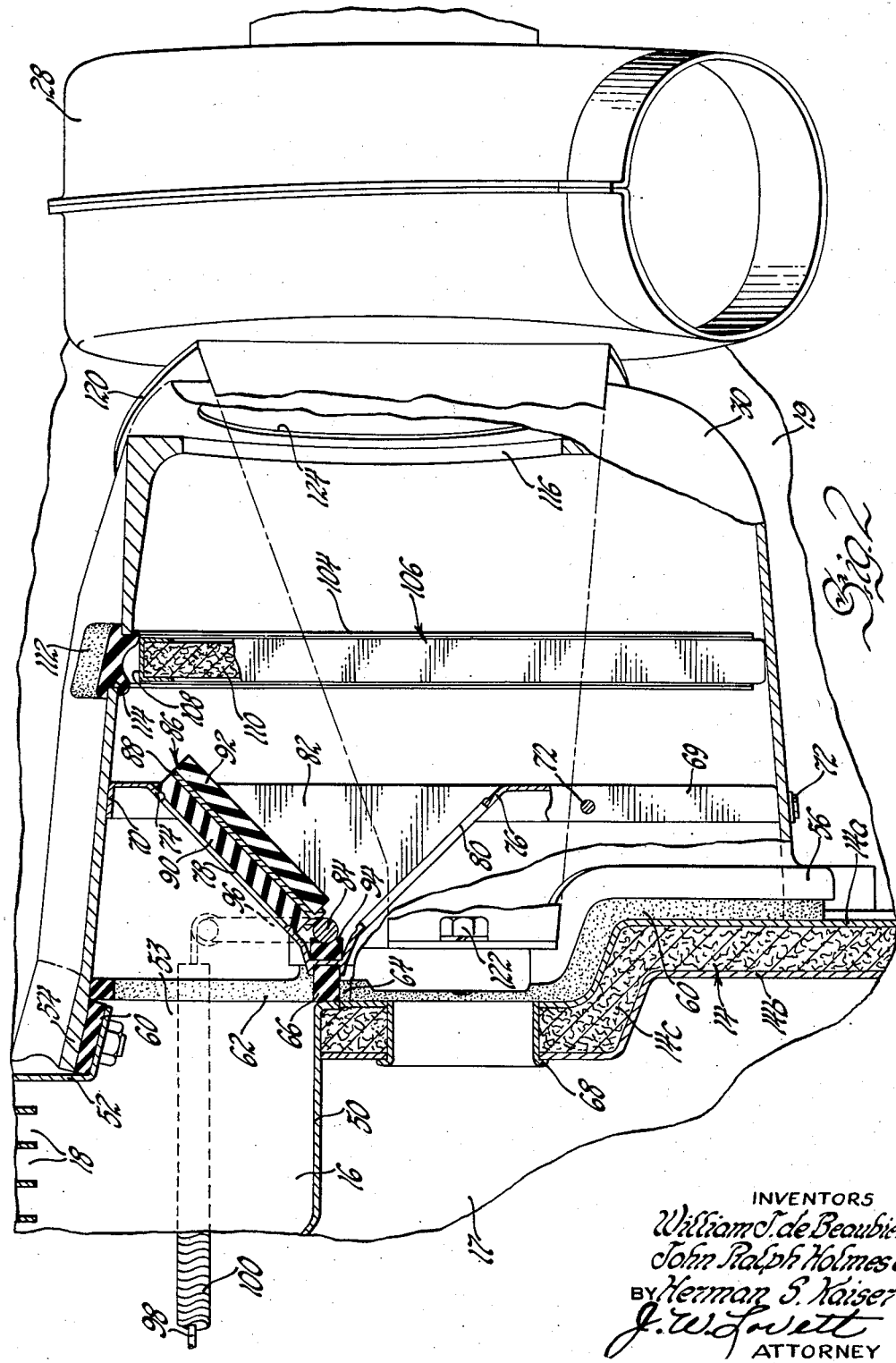

2,831,327

VEHICLE AIR CONDITIONING SYSTEMS

William J. de Beaubien, Birmingham, and Herman S. Kaiser, Pontiac, Mich., and John R. Holmes, Lockport, N. Y., assignors to General Motors Corporation, Detroit, Mich., a corporation of Delaware Application September 27, 1955, Serial No. 536,956

4 Claims. (Cl. 62—117.1)

This invention relates to air conditioning systems and more particularly to such systems as are employed in automotive vehicles and installed forwardly of the windshields.

Air conditioning for motor vehicles is rapidly becoming popular as its merits are more widely recognized. In the usual automotive assembly lines and also in servicing, however, air conditioned vehicles have required highly specialized treatment and extra handling to such an extent that costs have been high. Obviously, it is desirable that the special treatment and handling be minimized in order to reduce costs and maintenance difficulties and thereby increase the number of those who should receive the advantages well recognized as inherent in air conditioned vehicles—the realization of passenger comfort, especially during hot weather, and quietness of vehicle operation because of the absence of wind noise as the car windows need not be open.

An object of the present invention is to provide an improved air conditioning system which is compact, simple in arrangement and characterized by the ease with which it may be installed, operated and serviced.

A feature of the invention is a duct system including a casing adjacent the upper portion of a fire wall to serve as an air supply chamber, a blower, an evaporator core and a distributor chamber all intercommunicating and compactly arranged and also free of any outside air ventilator duct entering the passenger compartment. Another feature is a single valve for proportioning outside air and recirculated air for supplying the air conditioning system.

These and other features of the invention will now be described in detail in the specification and then pointed out more particularly in the claims.

In the drawings:

Fig. 1 is a perspective view of the front end of an automobile in which a preferred embodiment of the present invention is associated; and Fig. 2 is an enlarged view partly in section and taken through the fire wall of the vehicle and showing a portion of the air conditioning system depicted in Fig. 1.

The present invention is specially adapted for use on a type of vehicle body having a cowl chamber such as disclosed in the copending application for United States Letters Patent Serial No. 455,056, filed September 9, 1954, in the names of Lesley, Fox and Premo and entitled, "Vehicle Ventilation Systems Using Shroud Chambers." In the present instance such a vehicle body 10 is shown in the drawings having a windshield 12 and a fire wall 14, and a compartment or vehicle body chamber 16 extending forwardly of and below the windshield for receiving air by ram effect through louvers 18 when the vehicle is in motion or as induced by a blower. The fire wall 14 separates a passenger compartment 17 from an engine compartment 19.

The main mechanical components of the air conditioning system herein disclosed, except for the duct work, are a compressor 20, a condenser 22, a coolant liquid receiver 24, an evaporator core 26, a blower 28, a casing 30 serving as an air supply and filtering chamber, and an air distributor chamber 32.

The operation of the cooling cycle forms no part of the present invention but it will be understood that a coolant gas under low pressure is drawn into the compressor 20 through a conduit 34. From the compressor 20 it is delivered, under high pressure and temperature, by a conduit 36 to the upper portion of a condenser 22 located in front of the engine radiator. The latter has been omitted from the drawings. The condenser is subject to the flow of air due to the action of the engine fan or because of the car motion, as will be understood, and the coolant gas in the condenser becomes a liquid under high pressure which flows into the receiver or reservoir 24 by means of a line 38. This liquid is passed from the reservoir through a line 40 to a thermostatic expansion valve 42 under thermo-sensitive control. Preferably, a sight gauge 44 is installed in the line 40 permitting ease of visual inspection as to the coolant charge condition. Coolant discharged from the valve 42 expands and enters the evaporator 26 under low temperature and pressure conditions. Passage of warm air through the evaporator core causes the coolant to return to a gaseous state and simultaneously to absorb heat from the air. This cooled air is discharged into the vehicle passenger compartment, as will further appear, and the coolant gas is led by line 46 back to the flexible conduit 34 and compressor 20 to complete the cycle.

The amount of cooling is controlled by a thermostat having its temperature sensitive element adjustable to suit requirements. Conveniently, this element is located in the air distributor chamber 32 but it may be placed in the passenger compartment. It is not depicted in the drawings as this control is not part of the present invention. Such a control is shown in the United States application for Letters Patent Serial No. 418,931, filed March 26, 1954, in the name of James W. Jacobs and entitled, "Refrigerating Apparatus." It operates electrically to energize or de-energize a clutch 46' driving the compressor 20. Power to the clutch is, of course, taken from the engine crank shaft by V-belt drive or otherwise. Because of the electrical control of the compressor through a thermo-sensitive element, the air conditioning system is driven only when cooling is required and, as a consequence, economy in power and mechanical wear is realized.

The thermo-expansion valve 42 meters coolant into the evaporator core 26 and may be of the type disclosed in the application for United States Letters Patent Serial No. 399,014, filed December 18, 1953, in the names of Holmes, Zwicker and Mandy and entitled "Air Conditioning Systems" now Patent No. 2,787,888. Other means for controlling the coolant circulation or refrigerating effect of the evaporator 26 may be employed while utilizing the present invention.

As stated above, the fire wall 14 serves to separate the passenger compartment 17 from the engine compartment 19. This fire wall comprises two sheet material walls 14a and 14b between which is confined an insulating material 14c. The upper portion of the wall 14 terminates at a horizontal wall 50 which is joined with the wall 14a and is, therefore, a part of the body 10. A cross member 52 extends across the body and cooperates with the wall portion 50 to define an opening 53 leading into the upper portion of the casing 30. The rear portion of the wall 50 bends upwardly and cooperates with the cross member 52 to define the chamber 16. This chamber is L-shaped in cross section and closed at its top except for four groups of louvers 18 and extends substantially the length of the windshield. It will be appreciated that a high pressure area will be created at the base of the windshield 12 when the vehicle is in motion and, as a consequence, air may be admitted through the louvers 18 and then directed downwardly and the forwardly through the vehicle body chamber 16 and the opening 53. This arrangement constitutes an effective source of outside air high above the exhaust gas outlets of other cars.

The casing 30 is supported on the fire wall by means of a top flange 54 and a bottom and side flange 56. Suitable gasket material 60 is interposed between the fire wall and the edge portions of the casing 30 giving a proper seal. The gasket material is cut out as at 62 to form an opening registering with the opening 53 leading from the chamber 16. A second opening 64 is formed in the gasket material 60 and is defined by a cross portion 66 and marginal portions of the gasket material. These marginal portions conform with the flange 56 to form a seal with the fire wall. Passing through the fire wall 14 is a tubular member 68 which communicates with the opening 64 to form a recirculating port leading from the passenger compartment 17 into the casing 30.

A partition 69 is mounted across the interior of the casing 30 and arranged in substantially parallel relation with the fire wall. This partition is flanged around its periphery as at 70 and is suitably joined to the interior walls of the casing 30 as by screws 72. The partition is also provided with a V-shaped trough-like portion directed rearwardly and having two converging sides 74 and 76. These sides are ported as at 78 and 80 and join the cross portion 66 of the gasket material to form a seal therewith. The trough portion in the partition also has two end walls but only one end wall 82 is shown in the drawings.

A shaft 84 is journaled in the sides of the casing 30 and carries a valve member 86 adapted to close either the port 78 or the port 80. The valve member comprises an intermediate sheet metal stiffening member 88 and two facings 90 and 92 of yieldable material attached to opposite sides of the rigid member 88. A strip of resilient material 94 is interposed between the shaft 84 and the apex of the trough to hold the shaft in such a way as to prevent rattling and also to provide a seal. The shaft 84 is bent at one end as at 96 to form a crank and the end of this crank or lever is pivotally connected in a conventional manner to one end of a Bowden wire 98 guided in a conduit 100. The arragement of the Bowden wire and conduit is such that the former may be operated by a knob 102 within convenient reach of a passenger and located on the instrument panel.

A channel member such as the member 104 is fixed to each of the opposite sides of the casing 30 and in the interior thereof. These members form guides for the insertion and retention of a filter member 106. This member comprises a rectangular frame 108 surrounding a sheet of porous material 110 suitable for filtering air. A removable strip of rubber 112 seals an opening 114 in the top of the casing 30 and this opening is proportioned to permit insertion or replacement of the filter element 106.

The forwardly extending wall of the casing 30 bears an opening 116 which is in communication with the inlet of the blower 28. In order to lend rigidity in mounting the blower, a special bracket 120 is provided having oppositely disposed portions extending along the sides of the casing 30 and fixed to the fire wall by means of fastenings such as the bolt 122. The bracket 120 is, of course, provided with an opening 124 to permit the passage of air and is joined to the casing of the blower 28 by means not shown. The bracket 120 is not depicted in Figure 1 as it has no functional part in the operation and is merely a preferred way of firmly mounting the blower. If desired, the bracket 120 may be omitted and the casing 30 may be relied upon as an adequate support for the blower.

The evaporator core 26 is mounted to one side and below the casing 30 and adjacent to the fire wall 14. The evaporator core casing includes a cover member 130 which defines a somewhat wedge-shaped chamber for the introduction of air to the full cross section of the core. This cover has an integral inlet connection 132 which is connected to the outlet of the blower 28 by a flexible conduit 134. The core 26 is enclosed by means of a main casing 136 provided with a drainage device 138 for the removal of any water precipitated or condensed from the air flow. The casing 136 is rigidly attached to the air distributor chamber 32 which in turn is fastened to the fire wall by means not disclosed. The chamber 32 cooperates through an opening 140 formed in the fire wall with a distributor manifold 142 located on the passenger side of the fire wall. This manifold is connected by means of conduits 144, 146 and 148 to three air outlets 150, 152 and 154, respectively. The outlets 150 and 154 are located at opposite ends of the instrument panel and the outlet 152 is located near the center of the instrument panel and directed rearwardly.

From the above description, it may be seen that outside air entering through the chamber 16 by way of the louvers 18 may be admitted through the port 78 with proper positioning of the valve 86 and be filtered by the filter element 106 prior to being forced by the blower 28 through the core 26 for distribution into the passenger compartment 17.

In the event that air is to be recirculated from the passenger compartment and recooled by the core 26, then the valve 86 is positioned as shown in Fig. 2. Air will then enter through the tubular conduit 68 and the port 80 to the casing 30 for recirculation through the core 26 and the passenger compartment.

It will be noted that with any intermediate positioning of the single valve 86, outside air and recirculated air may be proportioned to suit any required conditions. The arrangement is simple and the main parts may easily be placed into their proper positions within the engine compartment or removed therefrom or serviced without employing many operations heretofore considered necessary.

We claim:

1. An air conditioning system for a vehicle body having a passenger compartment, a fire wall, a windshield and a vehicle body chamber located forwardly of said windshield and extending rearwardly from said fire wall to receive outside air, said system including a casing forward of said body chamber and cooperating with an upper portion of said fire wall to define an air supply chamber, an opening leading from said body chamber to said casing, a valve positioned to control air flow through said opening, filter means extending across the interior of said casing, a blower with its inlet communicating with a forward portion of said casing, an evaporator communicating with the outlet of said blower and arranged adjacent to said fire wall, and duct means extending rearwardly and connecting said evaporator with several zones of said passenger compartment.

2. An air conditioning sysetm for a vehicle body having a passenger compartment, a fire wall, a windshield and a vehicle body chamber located between said fire wall and said windshield, said body chamber being louvered to receive outside air from a zone forward of said windshield, said system including a casing located forwardly of said body chamber and cooperating with an upper portion of said fire wall to define an air supply chamber, a partition extending across said casing and having two ports therein, a port leading from said body chamber to one of said partition ports, a port in said fire wall in communication with the other of said ports in said partition, a valve arranged between the said two ports in the said partition and adapted to control air flow through them, a blower with its inlet communicating with said casing, an evaporator communicating with the outlet of said blower, and duct means extending rearwardly and connecting said evaporator with said passenger compartment.

3. An air conditioning system for a vehicle body having a passenger compartment, a fire wall, a windshield and a vehicle body chamber located forwardly of said windshield and extending rearwardly from said fire wall to receive outside air, said system including a casing located forwardly of said body chamber and cooperating with an upper portion of said fire wall to define an air supply chamber, said latter chamber being traversed by a substantially vertical partition, two ports in said partition, valve means arranged to control air flow through said two ports, one of said ports communicating with said body chamber, a port in said fire wall communicating with the other of said two ports and said passenger compartment, a filter extending across said casing and arranged forward of said partition, a blower with its inlet communicating with said casing forwardly of said filter element, an evaporator communicating with the outlet of said blower, and duct means extending rearwardly and connecting said evaporator with said passenger compartment.

4. An air conditioning system for a vehicle body having a passenger compartment, a fire wall, a windshield and a vehicle body chamber located in the cowl forwardly of said windshield and rearwardly of said fire wall, said body chamber being louvered to receive outside air, said system including a casing located forwardly of said body chamber and cooperating with an upper portion of said fire wall to define an air supply chamber, an upper port in said fire wall leading from said chamber to said casing, a second and lower port in said fire wall leading from said casing to said passenger compartment, means in said casing employing a single valve to control air flow through said ports, filter means extending across said casing, a blower with its inlet communicating with said casing forwardly of said filter means, an evaporator arrangement adjacent to said fire wall and communicating with the outlet of said blower, and duct means extending rearwardly and connecting said evaporator with several zones of said passenger compartment.

References Cited in the file of this patent

UNITED STATES PATENTS

| | | |
|---|---|---|
| 2,295,750 | Norris et al. | Sept. 15, 1942 |
| 2,738,651 | Phillip | Mar. 20, 1956 |